(12) United States Patent
Okada

(10) Patent No.: US 6,856,348 B1
(45) Date of Patent: Feb. 15, 2005

(54) CAMERA CAPABLE OF CHANGING THE NUMBER OF IMAGE FILES STORED IN A CURRENT DIRECTORY ACCORDING TO AN IMAGE PICKUP MODE

(75) Inventor: Masaki Okada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/542,365

(22) Filed: Apr. 4, 2000

(30) Foreign Application Priority Data

Apr. 6, 1999 (JP) .......................................... 11-098723

(51) Int. Cl.$^7$ ................................................ H04N 5/76
(52) U.S. Cl. ................................................ 348/231.2
(58) Field of Search ......................... 348/231.99, 231.2, 348/231.1, 231.3, 36; 396/49, 321

(56) References Cited

U.S. PATENT DOCUMENTS 5,576,759 A * 11/1996 Kawamura et al. .... 348/207.99
6,253,023 B1 * 6/2001 Fukushima et al. ......... 386/117
6,507,363 B1 * 1/2003 Anderson et al. ......... 348/231.9
2003/0095193 A1 * 5/2003 May et al. ............... 348/231.3

* cited by examiner

*Primary Examiner*—Wendy R. Garber
*Assistant Examiner*—Timothy J. Henn
(74) *Attorney, Agent, or Firm*—Cowan, Liebowitz & Latman

(57) ABSTRACT

In order to overcome such inconveniences that, when phototaking a combination of serial images as in the case of the continuous shooting mode or the panorama joining image pickup mode, these images are stored extending over different directories, in an electronic still camera capable of storing in one directory a predetermined number of image files each of which is formed from data of an image picked up by an image sensor, a desired image pickup mode is selected from among a plurality of kinds of image pickup modes, and, when the selected image pickup mode is a predetermined image pickup mode, an image file is stored in a current directory even if the number of image files stored in the current directory exceeds the predetermined number.

18 Claims, 3 Drawing Sheets

US 6,856,348 B1

CAMERA CAPABLE OF CHANGING THE NUMBER OF IMAGE FILES STORED IN A CURRENT DIRECTORY ACCORDING TO AN IMAGE PICKUP MODE

BACKGROUND OF THE INVENTION

1. Field of the Invention

The present invention relates to a storage method for an electronic still camera which is suitably used in, for example, a digital camera for digitally storing picked-up images.

2. Description of Related Art

In an electronic still camera represented by the conventional digital camera, the creation of image files is performed in accordance with a prescribed format. The format prescribed is as follows.

First, directories for treating images obtained by an electronic still camera are prepared, and therein a "CTG_(four-digit numeral)" directory is created. Here, in respect of the name of the "CTG_(four-digit numeral)" directory, the four-digit numeral starts from 0000 and increases in number in such a manner as to be 0001, 0002, . . . , as the photo-taking operation progresses, and upon overflow of the four digits of the numeral, the four-digit numeral proceeds to a five-digit numeral, becoming "CTG_(five-digit numeral)".

Then, an "AUT_(four-digit numeral).jpg" file as an image file is created in the above-mentioned "CTG_(four-digit numeral)" directory. In each "CTG_(four-digit numeral)" directory, for example, fifty "AUT_(four-digit numeral).jpg" files at the maximum per directory are created. Incidentally, "THM_(four-digit numeral).jpg" files of a thumbnail image are the same in numeral/number as "AUT_(four-digit numeral).jpg" files.

The reason why the maximum number of image files in one directory is set to fifty, is that, when additionally entering image files into a medium containing one thousand image files, if the upper limit to the number of files of one directory is fifty, the number of directory entries to be retrieved is only twenty, whereas if no limit is placed on the number of files for one folder, the number of directories to be retrieved can be as many as one thousand. Thus, by limiting the number of files in one directory, the ease-of-use of an electronic still camera is improved without increasing the interval of an image pickup action due to the increase in the number of directories to be retrieved.

However, since, in the above-described prior art, the upper limit of the number of files in one directory is set to fifty, there is a possibility that, when photo-taking a combination of serial images as in the case of a continuous shooting mode or a panorama joining image pickup mode, these images may be stored extending over different directories. In such a case, inconveniences have sometimes been caused when rearranging image files after photo-taking or when joining image files obtained by the panorama joining image pickup mode, using an application software program.

BRIEF SUMMARY OF THE INVENTION

It is, therefore, an object of the present invention to overcome the above-described inconveniences.

To attain the above object, in accordance with an aspect of the invention, there is provided an electronic still camera capable of storing in one directory a predetermined number of image files each of which is formed from data of an image picked up by image pickup means, the electronic still camera comprising selection means for selecting a desired image pickup mode from among a plurality of kinds of image pickup modes, and control means for, when the image pickup mode selected by the selection means is a predetermined image pickup mode, storing an image file in a current directory even if the number of image files stored in the current directory exceeds the predetermined number.

In accordance with another aspect of the invention, there is provided an electronic still camera capable of storing in one directory a predetermined number of image files each of which is formed from data of an image picked up by image pickup means, the electronic still camera comprising selection means for selecting a desired image pickup mode from among a plurality of kinds of image pickup modes, and control means for, when the image pickup mode selected by the selection means is a predetermined image pickup mode, creating a new directory different from a current directory and storing an image file in the created directory.

In accordance with a further aspect of the invention, there is provided a method for controlling an electronic still camera capable of storing in one directory a predetermined number of image files each of which is formed from data of an image picked up by image pickup means, the method comprising the steps of selecting a desired image pickup mode from among a plurality of kinds of image pickup modes, and, when the selected image pickup mode is a predetermined image pickup mode, storing an image file in a current directory even if the number of image files stored in the current directory exceeds the predetermined number.

In accordance with a further aspect of the invention, there is provided a method for controlling an electronic still camera capable of storing in one directory a predetermined number of image files each of which is formed from data of an image picked up by image pickup means, the method comprising the steps of selecting a desired image pickup mode from among a plurality of kinds of image pickup modes, and, when the selected image pickup mode is a predetermined image pickup mode, creating a new directory different from a current directory and storing an image file in the created directory.

In accordance with a further aspect of the invention, there is provided a storage medium which stores therein a program for executing a process for controlling an electronic still camera capable of storing in one directory a predetermined number of image files each of which is formed from data of an image picked up by image pickup means, the process comprising selecting a desired image pickup mode from among a plurality of kinds of image pickup modes, and, when the selected image pickup mode is a predetermined image pickup mode, storing an image file in a current directory even if the number of image files stored in the current directory exceeds the predetermined number.

In accordance with a further aspect of the invention, there is provided a storage medium which stores therein a program for executing a process for controlling an electronic still camera capable of storing in one directory a predetermined number of image files each of which is formed from data of an image picked up by image pickup means, the process comprising selecting a desired image pickup mode from among a plurality of kinds of image pickup modes, and, when the selected image pickup mode is a predetermined image pickup mode, creating a new directory different from a current directory and storing an image file in the created directory.

The above and other objects and features of the invention will become apparent from the following detailed descrip-

DETAILED DESCRIPTION OF THE INVENTION

Hereinafter, preferred embodiments of the invention will be described in detail with reference to the drawings.

Figure 1:
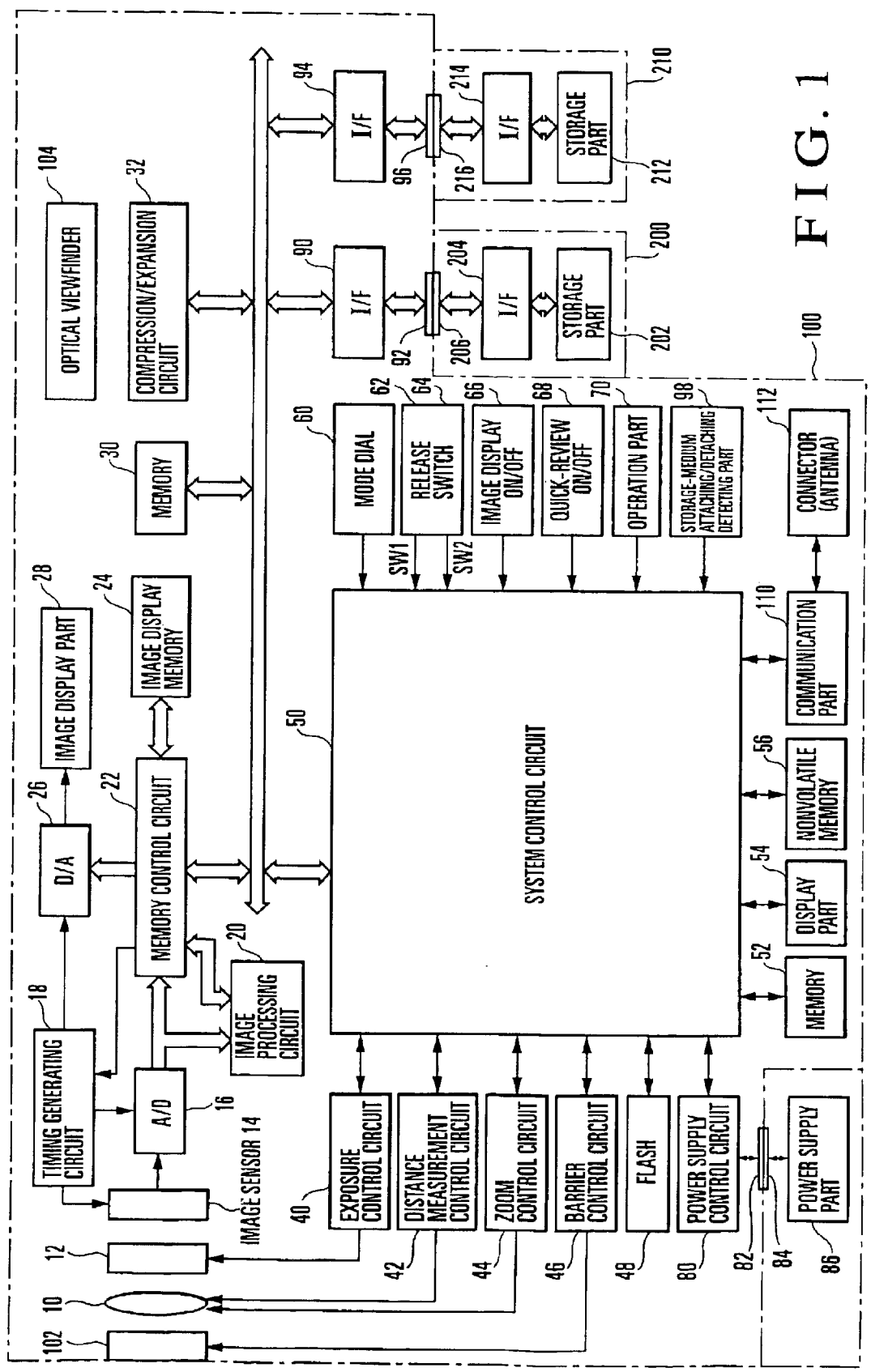
FIG. 1 is a block diagram showing the arrangement of an electronic still camera according to an embodiment of the invention.

FIG. 1 is a block diagram showing the arrangement of an electronic still camera according to an embodiment of the invention.

In FIG. 1, reference numeral 100 denotes an electronic still camera body. A lens optical system 10 incudes a zooming lens and a focusing lens, and a shutter 12 has an aperture controlling function of adjusting the quantity of incident light. A protection part 102 is a barrier for protecting an image pickup part from contamination or damage by covering the image pickup part including the lens 10 of the electronic still camera body 100. An optical viewfinder 104 for viewing an object image is provided therein with some features of a display part 54, such as an in-focus indication, a camera-shake warning indication, a flash charging indication, a shutter speed indication, an aperture value indication, and an exposure compensation indication.

An image sensor 14 is arranged to convert an optical image into an electric signal, and an A/D converter 16 is arranged to convert an analog signal output of the image sensor 14 into a digital signal. A timing generating circuit 18 is arranged to supply the image sensor 14, the A/D converter 16, and a D/A converter 26 with clock signals or control signals, and is controlled by a memory control circuit 22 and a system control circuit 50.

An image processing circuit 20 executes a predetermined pixel interpolation processing and a color conversion processing on data from the A/D converter 16 or data from the memory control circuit 22. In the image processing circuit 20, a predetermined arithmetic operation is performed using image data of a picked-up image. Based on a result of the arithmetic operation obtained, the system control circuit 50 exerts control over an exposure control circuit 40 and a distance measurement control circuit 42 in terms of the AF (auto focus) processing of the TTL (through-the-lens) method, the AE (auto exposure) processing, and the EF (electronic flash preliminary emission) processing. Further, in the image processing circuit 20, a predetermined arithmetic operation is performed using data of a picked-up image, and the AWB (auto white balance) processing of the TTL method is also performed based on a result of the arithmetic operation obtained.

The memory control circuit 22 exerts control over the A/D converter 16, the timing generating circuit 18, the image processing circuit 20, an image display memory 24, the D/A converter 26, a memory 30, and a compression/expansion circuit 32. The image signal converted by the A/D converter 16 into a digital signal is written into the image display memory 24 or the memory 30 through the image processing circuit 20 and the memory control circuit 22, or directly through the memory control circuit 22.

Reference numeral 28 denotes an image display part made of a TFT LCD (thin-film transistor liquid crystal display) or the like. Image data for display written into the image display memory 24 is displayed by the image display part 28 via the D/A converter 26. The image display part 28 successively displays image data of picked-up images, so that the function of an electronic viewfinder is realized. The image display part 28 is capable of arbitrarily turning on or off a display in accordance with the instruction of the system control circuit 50. When the display of the image display part 28 is turned off, it is possible to significantly reduce the power consumption of the electronic still camera body 100.

The memory 30 is composed of a RAM or the like, and is arranged to store picked-up still images or moving images. The memory 30 has a storage capacity proof against the storage of high-speed and massive images, even when executing a continuous shooting operation in which a plurality of still images are continuously photographed, or when executing a panorama joining image pickup operation. Further, the memory 30 is usable as a working area for the system control circuit 50.

The compression/expansion circuit 32 is arranged to compress or expand image data by adaptive discrete cosine transform (ADCT) or the like. After reading the data stored in the memory 30, the compression/expansion circuit 32 executes a compression or expansion processing, and then rewrites the data processed into the memory 30.

The exposure control circuit 40 is arranged to control the shutter 12 having an aperture controlling function, and has a flash adjusting capability through the association with a flash 48 as described later. The distance measurement control circuit 42 controls the focusing of the focusing lens of the lens optical system 10, and a zoom control circuit 44 controls the zooming of the zooming lens of the lens optical system 10. A barrier control circuit 46 controls the action of the protection part 102 as a barrier.

The exposure control circuit 40 and the distance measurement control circuit 42 are controlled through the TTL method. The control over the exposure control circuit 40 and the distance measurement control circuit 42 is executed by the system control circuit 50 on the basis of a result of the arithmetic operation obtained by performing an operation on image data of a picked-up image, using the image processing circuit 20.

The flash 48 has an AF auxiliary light projecting capability, and a flash adjusting capability.

The system control circuit 50 is arranged to exert a general control over the electronic still camera body 100. The memory 52 is composed of a ROM or the like, and stores constants, variables, programs, etc., for the action of the system control circuit 50.

The display part 54 is arranged to display operation states, messages, etc., using characters and images in accordance with the execution of programs in the system circuit 50. The display part 54 composed of one or more units is provided at the position (not shown) from which it is easy to be visually recognized and which is in the vicinity of an operation part of the electronic still camera body 100, and the display part 54 is composed of, for example, a combination of LCDs, LEDs, or the like. The display part 54 may be used in combination with a sounding element such as a speaker. Also, some functions of the display part 54 may be provided within the optical viewfinder 104 or within the image display part 28.

Among the display contents of the display part 54, what to be displayed on the LCD or the like includes a single-shooting/continuous-shooting indication, a self-timer indication, a compression ratio indication, a number-of-stored-pixels indication, a number-of-stored-images indication, a number-of-remaining-photographable-images indication, a shutter speed indication, an aperture value indication, an exposure compensation indication, a flash indication, a red-eye prevention indication, a macro photography indication, a buzzer setting indication, a clock battery remaining quantity indication, a battery remaining quantity indication, an error indication, an information indication by plural-digit numerals, an attaching/detaching state indication of storage media 200 and 201, a communication I/F action indication, a date/time indication, etc.

Moreover, among the display contents of the display part 54, what to be displayed within the optical viewfinder 104 includes an in-focus indication, a camera-shake warning indication, a flash charging indication, a shutter speed indication, an aperture value indication, an exposure compensation indication, etc.

Reference numeral 56 denotes a nonvolatile memory capable of erasing and storing data. For the nonvolatile memory 56, for example, an EEPROM is employed.

Reference numerals 60, 62, 64, 66, 68 and 70 denote operation parts for inputting various operation instructions of the system control circuit 50. Each of the operation parts is composed of one of, or a combination of a plurality of, switch-dials, touch panels, pointing units using visual-line detection, and voice recognition units, etc.

Here, there will be given specific descriptions of these operation parts 60, 62, 64, 66, 68 and 70.

The mode dial 60 can perform a change-over setting of various function modes such as a power-off mode, an automatic image pickup mode, an image pickup mode, a panorama joining image pickup mode, a reproduction mode, a multi-picture reproduction/erasure mode, a PC connection mode, etc. Here, "the panorama joining image pickup mode" refers to a mode in which surrounding images are photographed while sequentially changing photo-taking directions of the electronic still camera body 100.

The shutter switch (SW1) 62 is turned on in response to the midway operation of a shutter button (not shown), so as to give an instruction for starting actions such as an AF (auto focus) processing, an AE (auto exposure) processing, an AWB (auto white balance) processing, and an EF (electronic flash preliminary emission) processing.

The shutter switch (SW2) 64 is turned on upon completion of the operation of the shutter button (not shown), so as to give an instruction for starting a sequence of actions, including an exposure processing in which an image signal read from the image sensor 14 is written, as image data, into the memory 30 via the A/D converter 16 and the memory control circuit 22, an image processing using an arithmetic operation in the image processing circuit 20 and the memory control circuit 22, a compression processing in which image data is read out from the memory 30 and is compressed in the compression/expansion circuit 32, and a storage processing in which the image data is written in the storage medium 200 or 210.

The image display ON/OFF switch 66 is capable of setting the turning-on and turning-off of the image display part 28. This capability permits the achievement of power saving, through shutting-off of the power supply to the image display part 28 composed of a TFT LCD or the like, when conducting photo-taking using the optical viewfinder 104.

The quick-review ON/OFF switch 68 sets a quick-review function for automatically reproducing picked-up image data immediately after the image pickup action. In the present embodiment, the quick-review ON/OFF switch 68 is arranged to have the function of setting the quick-review particularly when the image display part 28 is turned off.

The operation part 70 is composed of various buttons, touch panels, etc., including a menu button, a set button, a macro button, a multi-picture reproduction page-break button, a flash setting button, a single-shooting/continuous-shooting/self-timer change-over button, a menu shifting + (plus) button, a menu shifting – (minus) button, a reproduced-image shifting + (plus) button, a reproduced-image shifting – (minus) button, a picked-up image-quality selecting button, an exposure compensation button, a date/time setting button, etc.

A power supply control circuit 80 is composed of a battery detecting circuit, a DC-DC converter, a switching circuit for switching blocks to be energized in the electronic still camera body 100, etc. The power supply control circuit 80 detects the presence or absence of a battery, the type of the battery, and the remaining quantity of the battery, and controls the DC-DC converter on the basis of the detection results and the instruction of the system control circuit 50, to supply all parts including the storage media with a required voltage for a required period of time.

Reference numerals 82 and 84 denote connectors, and reference numeral 86 denotes a power supply part composed of a primary battery such as an alkali battery or a lithium battery, a secondary battery such as an NiCd battery, an NiMH battery or an Li battery, or an AC adapter.

The storage media 200 and 210 are each composed of a memory card, a hard disk or the like, and have storage parts 202 and 212 each composed of a semiconductor memory, a magnetic disk or the like, interfaces 204 and 214 for communicating with the electronic still camera body 100, and connectors 206 and 216 for performing the connection with the electronic still camera body 100, respectively.

Interfaces 90 and 94 are components for communicating with the storage media such as a memory card or a hard disk, and connectors 92 and 96 are components for performing the connection with the storage media such as a memory card or a hard disk. A storage-medium attaching/detaching detecting part 98 detects whether or not the storage medium 200 is attached to the connector 92, and/or whether the storage medium 210 is attached to the connector 96.

Incidentally, the present embodiment is explained as having two systems of the interfaces and connectors for connecting the storage media. Needless to say, however, the present embodiment may be constructed so that the interface and the connector for connecting the storage medium are composed of a single system or a plurality of systems. Also, the present embodiment may be constructed so as to have the combination of a plurality of systems of interfaces and connectors each having mutually different standard.

Moreover, the interfaces 90 and 94 and the connectors 92 and 96 may have a construction which conforms to the standard of a PCMCIA card, a CF (compact flash-memory) card or the like. Further, in a case where the interfaces 90 and 94 and the connectors 92 and 96 have a construction which conforms to the standard of a PCMCIA card, a CF (compact flash-memory) card or the like, by connecting various communication cards such as a LAN card, a modem card, a USB card, an IEEE1394 card, a P1284 cared, an SCSI card, a PHS card or the like, image data or management information associated with the image data can be mutually transferred between the electronic still camera and a peripheral equipment such as another computer or a printer.

A communication interface 110 is a component for communicating data with an external equipment, and has various communicational features such as RS232C, USB, IEEE1394, P1284, SCSI, modem, LAN, and wireless communication. A connector (antenna) 112 connects the electronic still camera body 100 with the other equipment through the intermediary of the communication interface 110 (however, in the case of wireless communication, the connector 112 serves as an antenna).

Figure 2:
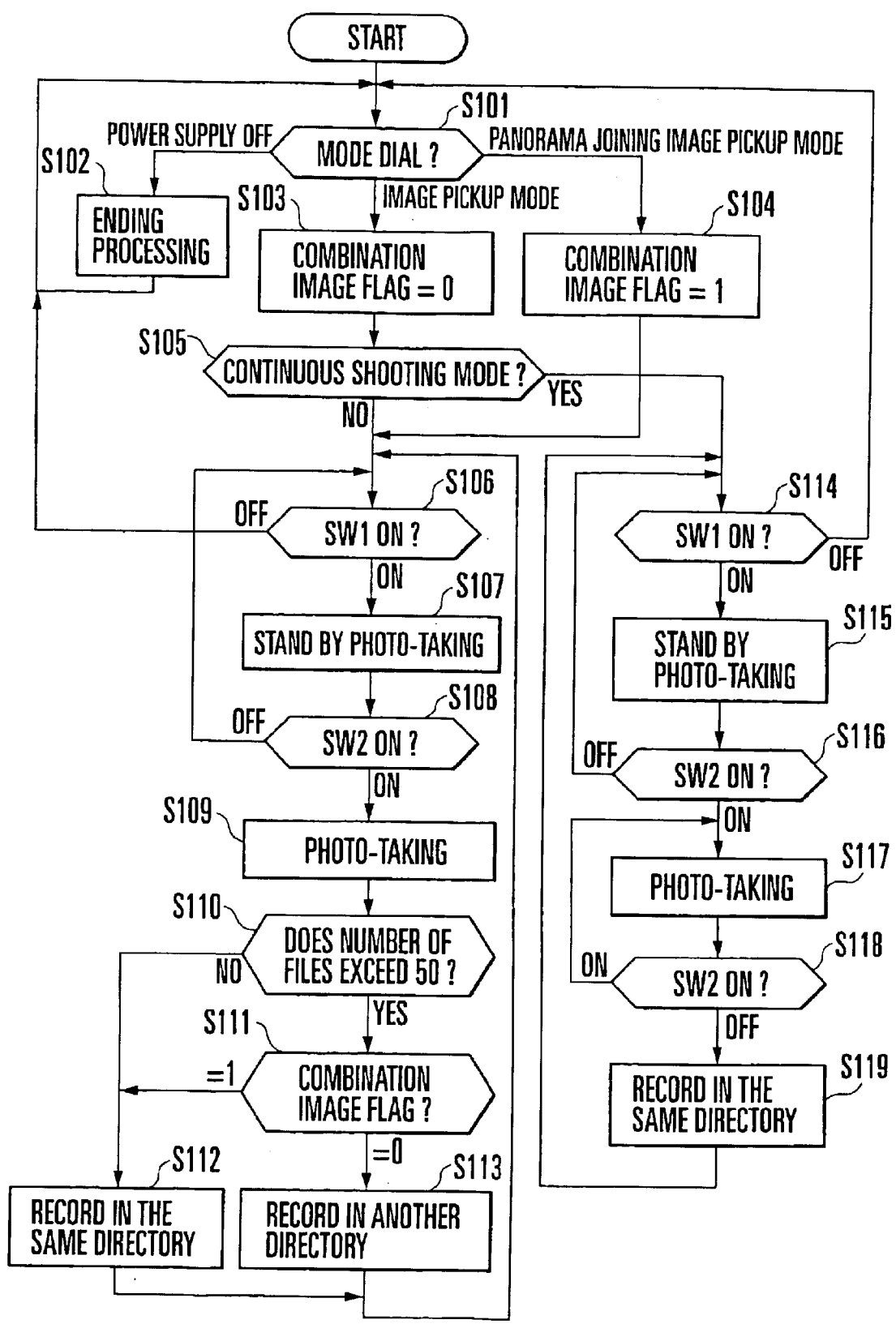
FIG. 2 is a flow chart showing a processing operation of the electronic still camera according to the embodiment of the invention.

Next, the operation of the electronic still camera body 100 according to the embodiment of the invention will be described with reference to FIG. 2. FIG. 2 is a flow chart showing the operation processing of the memory control circuit 22 in the embodiment of the invention.

The system control circuit 50 judges the setting position of the mode dial 60 (S101). If the mode dial 60 is set to the power-supply OFF position, the system control circuit 50 executes a predetermined ending processing such as to change the display of each display part to the ending state, to close the barrier of the protection part 102 to protect the lens optical system 10, to store required parameters including flags and control variables, set values, and a setting mode in the nonvolatile memory 56, to shut off, by the power supply control circuit 80, unnecessary power supply for each part of the electronic still camera body 100 including the image display part 28 (S102). Then, the flow returns to the step S101.

If, at the step S101, the mode dial 60 is judged to be set to the image pickup mode, on the basis of the transmission from the system control circuit 50, the flow proceeds to a step S103. On the other hand, if the mode dial 60 is judged to be set to the panorama joining image pickup mode, the flow proceeds to a step S104.

In the case of the image pickup mode, at the step S103, a combination image flag is set to "0" (combination image flag=0), and the flow proceeds to a step S105. On the other hand, in the case of the panorama joining image pickup mode, at the step S104, the combination image flag is set to "1" (combination image flag=1), and the flow proceeds to a step S106.

At the step S105, if the single-shooting/continuous-shooting/self-timer change-over button is set to the continuous shooting mode by the operation of the operation part 70, the flow proceeds to a step S114, while if the single-shooting/continuous-shooting/self-timer change-over button is set to the single shooting mode, the flow proceeds to a step S106. Here, in the present embodiment, because the self-timer mode is unrelated to the invention, the operation is assumed to be the same as in the case of the single shooting mode. Further, "the single shooting mode" refers to an ordinary image pickup mode in which one image is picked up every time the switch SW2 is depressed, and "the continuous shooting mode" refers to a mode in which a plurality of images are continuously picked up at a predetermined time interval for the time period during which the switch SW2 is depressed.

In the step S106, if the shutter switch (SW1) 62 is depressed, the flow proceeds to a step S107, where the standing-by for the above-described image pickup action is conducted. On the other hand, if the shutter switch (SW1) 62 is not depressed, the flow returns to the step S101.

In the next step S108, if the shutter switch (SW2) 64 is depressed, the flow proceeds to a step S109, where the above-described image pickup action is executed. After a predetermined image processing is executed in the compression/expansion circuit 32 or the like, an image file is created on the memory 30. On the other hand, if the shutter switch (SW2) 64 is not depressed, the flow returns to the step S106.

Then, at a step S110, if the number of "AUT_(four-digit numeral).jpg" files existing in a current directory exceeds "50", the flow proceeds to a step S111, and if not so, the flow proceeds to a step S112.

At the step 111, if the combination image flag is set to "1" (combination image flag=1) (i.e., in the panorama joining image pickup mode), the flow proceeds to the step S112, where the above-mentioned image file created is stored in the current directory irrespective of the number of files existing in the current directory, and then the image file is stored in the storage medium 200 or 210. On the other hand, if the combination image flag is set to "0" (combination image flag=0), the flow proceeds to a step S113, where the above-mentioned image file created is stored in another current directory newly created, and then the image file is stored in the storage medium 200 or 210.

Next, at the step S114, if the shutter switch (SW1) 62 is depressed, the flow proceeds to a step S115, where the above-mentioned standby action is executed. On the other hand, if the shutter switch (SW1) 62 is not depressed, the flow returns to the step S101.

Then, at a step S116, if the shutter switch (SW2) 64 is depressed, the flow proceeds to a step S117, where the above-mentioned image pickup action is executed, and a file of an image picked up is created. On the other hand, if the shutter switch (SW2) 64 is not depressed, the flow returns to the step S114.

After the execution of the image pickup action in the step S117, the flow proceeds to a step S118. At the step S118, if the shutter switch (SW2) 64 remains depressed, the flow returns to the step S117, so that the image pickup action is executed again.

On the other hand, if the depression of the shutter switch (SW2) 64 is ended, the flow proceeds to a step S119, where files of images picked up by a series of continuous shooting actions are stored in a current directory, irrespective of the number of files existing in the current directory, and then the image files are stored in the storage medium 200 or 210.

As described above, in the case of the panorama joining image pickup mode or the continuous shooting mode, since a series of image files is stored in the same directory, the retrieval/rearrangement of image files is able to be easily performed, so that it is possible to provide an ease-of-use electronic still camera.

Next, one example of the directory structure in the embodiment of the invention will be described with reference to FIG. 3.

First, in a ROOT directory (D100), directories for accommodating image files, such as a DC97 directory (D101) or a DCIM directory (D102), are created. Also, in the DC97 directory, a CTG_0001 directory (D103) for accommodating fifty image files is created so that only a few directory entries to be retrieved are required.

In the ordinary photo-taking (single shooting or self-timer photo-taking), fifty image files from AUT_0001.jpg (D106) through AUT_0050.jpg (D107) are accommodated in the above-mentioned CTG_0001 directory, and after the image file AUT_0050.jpg has been stored, a new CTG_0002 directory (D104) is created.

In the panorama joining image pickup mode or the continuous shooting mode, even if a combination of image files such as STA_0100.jpg, STB_0101.jpg, STC_0102.jpg and STD_0103.jpg comes near to the excess of fifty which is the accommodation upper-limit number of the CTG_0002 directory, the combination of image files is stored in the CTG_0002 directory as it is.

Figure 3:
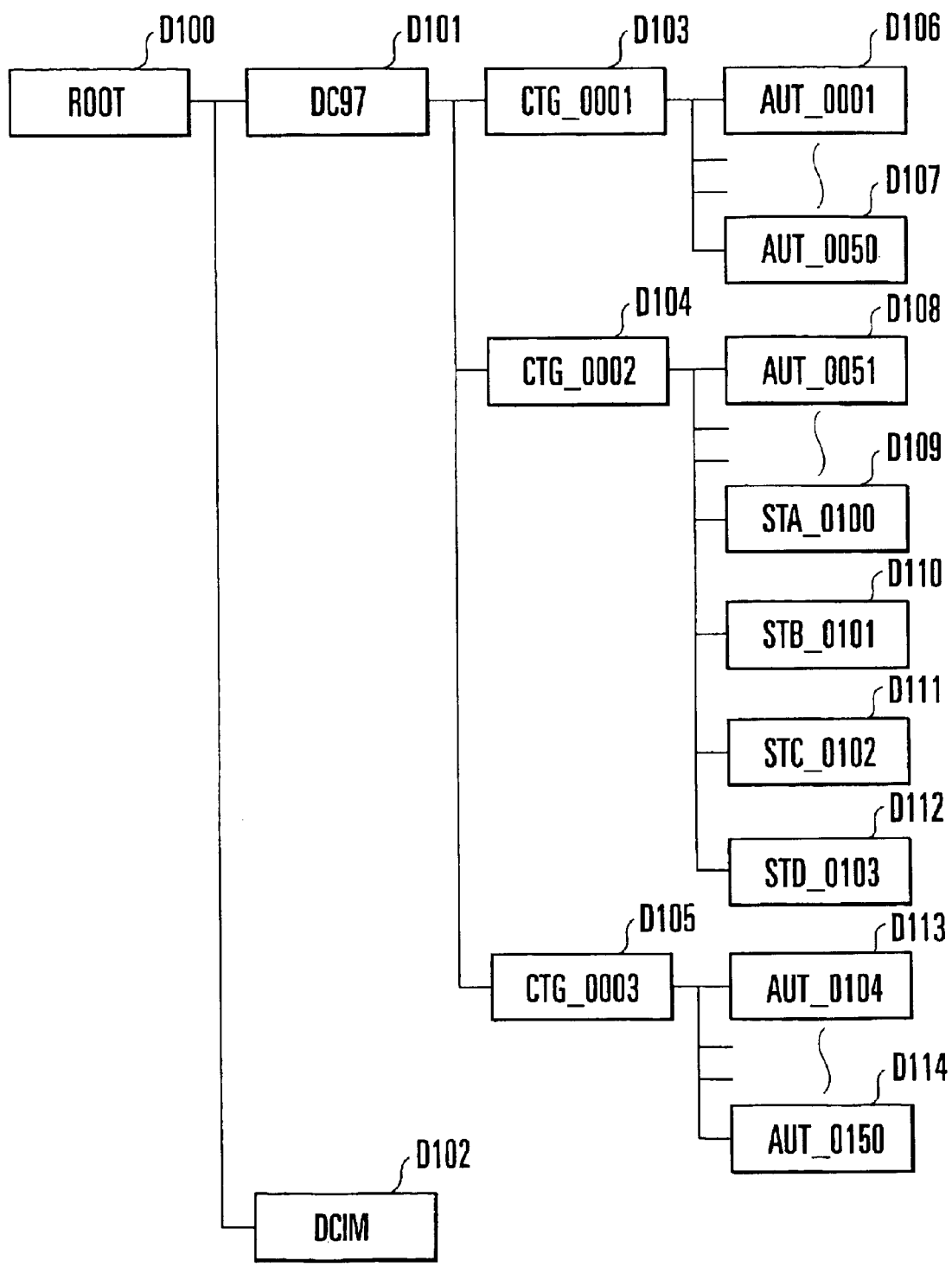
FIG. 3 is a diagram showing an example of a directory structure in the embodiment of the invention.

Then, in FIG. 3, a file AUT_0104.jpg is stored in a CTG_0003 directory newly created. In other words, the file AUT_0104.jpg is stored using the file number next to the file number stored in the CTG_0002 directory. That is, an image file is stored with an identification number in the photo-taking order appended, irrespective of the image pickup mode and the location of the directory in which the previous image files are stored. This is because, if, for example, the number "0101" which is used when delimiting a directory with fifty image files is employed, the identical number is also found in the CTG_0002 directory (D104), which causes inconveniences when the user rearranges the files later.

Incidentally, in the present embodiment, when a combination of images obtained in the panorama joining image pickup mode or the continuous shooting mode has been completely stored, if the number of image files stored in the CTG_0002 directory is less than fifty, subsequent image files are stored in the CTG_0002 directory until fifty image files have been stored.

However, as an alternative embodiment, a new CTG_0003 directory may be created to store the successive image files therein, after the photo-taking of the combination of images. As a further alternative embodiment, only a combination of images obtained in the panorama joining image pickup mode or the continuous shooting mode may be stored in a single directory. In the former case of these alternatives, upon completing of the photo-taking in the panorama joining image pickup mode or the continuous shooting mode, a new directory is created. In the latter case, a new directory is created as the photo-taking in the panorama joining image pickup mode or the continuous shooting mode, and the image files photographed in the panorama joining image pickup mode or the continuous shooting mode are stored in that directory newly created. The other features are similar to those of the above-described embodiment.

In the present embodiment, although the number of image files to be stored in a directory in the ordinary image pickup mode such as the single shooting mode or the self-timer mode is set to fifty, the number of image files is not particularly limited to fifty. It may be a multiple of fifty, or any other number.

The present embodiment can be achieved, as an example, by supplying a system or an apparatus with a storage medium in which program codes of the software that implements the above-described capabilities are stored, and making a computer (or a CPU or an MPU) of the system or the apparatus read and execute the program codes stored in the storage medium.

In this case, the program codes themselves read from the storage medium realizes the above-described capabilities of the present embodiment, and, hence, the storage medium storing the program codes constitutes the present invention.

As a storage medium for supplying program codes, for example, a floppy disk, a hard disk, an optical disk, a magneto-optical disk, a CD-ROM, a CD-R, a magnetic tape, a nonvolatile memory card or a ROM can be employed.

The realization of the above-described capabilities of the present embodiment is based not only on the executing of the program codes read by a computer, but also on the practical processing a part of which or the whole of which is executed by an OS (operating system) or the like operating on the computer in accordance with the instructions of the program codes.

Moreover, the realization of the above-described capabilities of the present embodiment is also based on the practical processing a part of which or the whole of which is executed by a CPU or the like provided in a function extension board inserted into a computer or a function extension unit connected to the computer, in accordance with the instructions of the program codes read from the storage medium, after the program codes have been written into a memory provided in the function extension board or the function extension unit.

When the present embodiment is applied to the above-described storage medium, program codes corresponding to the above-described flow chart are stored in the storage medium. That is, a module indispensable for the electronic still camera of the present embodiment is stored in the storage medium.

As described above, in accordance with the present embodiment, since the upper-limit number of files stored in one directory is not limited when performing photo-taking in the continuous shooting mode or the panorama joining image pickup mode, a combination of serial image files can be stored in one directory. This arrangement permits the improvement in user-friendliness when rearranging image files after photo-taking, or when synthesizing a panorama image from image files photographed by the panorama joining image pickup operation, using an application software program.

While the invention has been described in the preferred embodiment thereof, obviously many modifications and variations of the present invention are possible in the light of the above teachings. It is, therefore, to be understood that within the scope of the appended claims, the invention may be practiced otherwise than as specifically described.

What is claimed is:

1. An electronic still camera capable of storing in one directory a predetermined number of image files each of which is formed from data of an image picked up by an image pickup unit in accordance with the operation of image-pickup start direction member, said electronic still camera comprising:

selection unit which selects a desired image pickup mode from among a plurality of kinds of image pickup modes; and control unit which, when the image pickup mode selected by said selection unit is a predetermined image pickup mode, allows to store the image files in a current directory even if the number of image files stored in the current directory exceeds the predetermined number, and when the image pickup mode selected by said selection unit is another mode, forbids to store the image files which exceed the predetermined number in the current directory.

2. An electronic still camera according to claim 1, wherein the predetermined image pickup mode is a mode of picking up images which constitute a combination of serial images.

3. An electronic still camera according to claim 1, wherein the predetermined image pickup mode is a continuous shooting mode of continuously picking up images at a predetermined time interval.

4. An electronic still camera according to claim 1, wherein the predetermined image pickup mode is a panorama joining image pickup mode.

5. An electronic still camera according to claim 1, wherein the predetermined number of image files is a multiple of fifty.

6. An electronic still camera according to claim 1, wherein said control means stores image files each having an identification number in an image pickup order appended, irrespective of the selected image pickup mode and a location of the directory in which the image files are stored.

7. A method for controlling an electronic still camera capable of storing in one directory a predetermined number of image files each of which is formed from data of an image picked up by an image pickup unit in accordance with the operation of image-pickup start direction member, said method comprising the steps of:

selecting a desired image pickup mode from among a plurality of kinds of image pickup modes; and when the selected image pickup mode is a predetermined image pickup mode, allowing to store the image files in a current directory even if the number of image files stored in the current directory exceeds the predetermined number, and when the selected image pickup mode is another mode, forbidding to store the image files which exceed the predetermined number in the current directory.

8. A method according to claim 7, wherein the predetermined image pickup mode is a mode of picking up images which constitute a combination of serial images.

9. A method according to claim 7, wherein the predetermined image pickup mode is a continuous shooting mode of continuously picking up images at a predetermined time interval.

10. A method according to claim 7, wherein the predetermined image pickup mode is a panorama joining image pickup mode.

11. A method according to claim 7, wherein the predetermined number of image files is a multiple of fifty.

12. A method according to claim 7, further comprising a step of storing image files each having an identification number in an image pickup order appended, irrespective of the selected image pickup mode and a location of the directory in which the image files are stored.

13. A storage medium which stores therein a program for executing a process for controlling an electronic still camera capable of storing in one directory a predetermined number of image files each of which is formed from data of an image picked up by an image pickup unit in accordance with the operation of image-pickup start direction member, said process comprising:

selecting a desired image pickup mode from among a plurality of kinds of image pickup modes; and when the selected image pickup mode is a predetermined image pickup mode, allowing to store the image files in a current directory even if the number of image files stored in the current directory exceeds the predetermined number, and when the selected image pickup mode is another mode, forbidding to store the image files which exceed the predetermined number in the current directory.

14. A storage medium according to claim 13, wherein the predetermined image pickup mode is a mode of picking up images which constitute a combination of serial images.

15. A storage medium according to claim 13, wherein the predetermined image pickup mode is a continuous shooting mode of continuously picking up images at a predetermined time interval.

16. A storage medium according to claim 13, wherein the predetermined image pickup mode is a panorama joining image pickup mode.

17. A storage medium according to claim 13, wherein the predetermined number of image files is a multiple of fifty.

18. A storage medium according to claim 13, wherein said process further comprises storing image files each having an identification number in an image pickup order appended, irrespective of the selected image pickup mode and a location of the directory in which the image files are stored.

* * * * *